United States Patent
Nomoto et al.

(10) Patent No.: US 11,593,253 B2
(45) Date of Patent: Feb. 28, 2023

(54) SAFETY VERIFICATION SYSTEM FOR ARTIFICIAL INTELLIGENCE SYSTEM, SAFETY VERIFICATION METHOD, AND SAFETY VERIFICATION PROGRAM

(71) Applicant: Japan Manned Space Systems Corporation, Tokyo (JP)

(72) Inventors: Hideki Nomoto, Tokyo (JP); Yasutaka Michiura, Tokyo (JP); Shota Iino, Tokyo (JP)

(73) Assignee: JAPAN MANNED SPACE SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 17/634,183

(22) PCT Filed: Nov. 12, 2020

(86) PCT No.: PCT/JP2020/042229
§ 371 (c)(1),
(2) Date: Feb. 9, 2022

(87) PCT Pub. No.: WO2021/100597
PCT Pub. Date: May 27, 2021

(65) Prior Publication Data
US 2022/0269588 A1    Aug. 25, 2022

(30) Foreign Application Priority Data
Nov. 22, 2019   (JP) .............................. JP2019-211156

(51) Int. Cl.
*G06F 11/36*    (2006.01)
*G05B 13/00*    (2006.01)
*G06N 3/02*    (2006.01)

(52) U.S. Cl.
CPC .......... *G06F 11/3672* (2013.01); *G05B 13/00* (2013.01); *G06F 11/362* (2013.01); *G06N 3/02* (2013.01)

(58) Field of Classification Search
CPC .......... G05B 13/00; G06N 3/02; G06F 11/362; G06F 11/3672
See application file for complete search history.

(56) References Cited

U.S. PATENT DOCUMENTS 11,354,458 B1 * 6/2022 Schwalb ................ G06F 30/20
2019/0121722 A1   4/2019 Kuruma et al.
(Continued)

FOREIGN PATENT DOCUMENTS

| CN | 103198015 A | 7/2013 |
| CN | 103902853 A | 7/2014 |

(Continued)

OTHER PUBLICATIONS

J. Hull, D. Ward and R. R. Zakrzewski, "Verification and validation of neural networks for safety-critical applications," Proceedings of the 2002 American Control Conference (IEEE Cat. No. CH37301), 2002, pp. 4789-4794 vol. 6, doi: 10.1109/ACC.2002.1025416. (Year: 2002).*

(Continued)

*Primary Examiner* — Ronald D Hartman, Jr.
(74) *Attorney, Agent, or Firm* — Birch, Stewart, Kolasch & Birch, LLP

(57) ABSTRACT

An effective system for verifying safety of an artificial intelligence system includes a feature quantity information accepting unit which accepts feature quantity information that includes values of plural feature quantities, that are assumed as those used in an artificial intelligence system, in each of plural first test data used for a test for verifying safety of the artificial intelligence system; and a judgment (Continued)

unit which judges a first combination, that is a combination that is not included in the plural first test data, in combinations of values that plural feature quantities may take, or a second combination, with it plural correct analysis results that should be derived by the artificial intelligence are associated, in the combinations of the values that the plural feature quantities may take.

8 Claims, 15 Drawing Sheets

(56) References Cited

U.S. PATENT DOCUMENTS

| | | | | |
|---|---|---|---|---|
| 2020/0409359 | A1* | 12/2020 | Kapinski | G06N 3/002 |
| 2021/0157909 | A1 | 5/2021 | Yamamoto et al. | |

FOREIGN PATENT DOCUMENTS

| | | | | | |
|---|---|---|---|---|---|
| CN | 109034632 | | * | 3/2018 | G06N 3/084 |
| CN | 110488791 | | * | 4/2019 | G05B 23/0243 |
| CN | 110132352 | | * | 5/2019 | G01D 21/02 |
| EP | 3291035 | A1 | * | 3/2018 | G05B 17/02 |
| JP | 2016-81228 | A | | 5/2016 | |
| JP | 2019-75035 | A | | 5/2019 | |
| WO | WO-2017217701 | A1 | * | 12/2017 | G06F 11/3604 |
| WO | WO 2019/073557 | A1 | | 4/2019 | |

OTHER PUBLICATIONS

Hybrid Neural-Network Genetic-Algorithm Technique for Aircraft Engine Performance Diagnostics; Kobayashi et al., 8 pages, Journal of Propulsion and Power vol. 21, No. 4, Jul.-Aug. 2005 (Year: 2005).*

Decision to Grant a Patent issued in Japanese Application No. 2021-558331, dated Dec. 21, 2021.

International Search Report (PCT/ISA/210) issued in PCT/JP2020/042229, dated Feb. 2, 2021.

Katahira, "Validation technology for upstream process specifications in space systems", SEC Journal, vol. 10, No. 2, ISSN 1349-8622, chapter 4.4.1, 2014, pp. 46-53.

Nomoto et al., "New Safety Engineering using FRAM (Functional Resonance Analysis Method)", SEC Journal, vol. 14, No. 1, ISSN 1349-8622, chapter 2.3, 4, 2018, pp. 42-49.

Sharma et al., "CERTIFAI: Counterfactual Explanations for Robustness, Transparency, Interpretability, and Fairness of Artificial Intelligence models", arXiv.org [online], arXiv: 1905.07857v1, Cornell University, Internet: <URL: https://arxiv.org/pdf/1905.07857v1>, 2019, retrieved Jan. 2020, pp. 1-8.

Chinese Office Action and Search Report for Chinese Application No. 202080058982.3, dated Jun. 24, 2022, with English translation of the Chinese Office Action.

* cited by examiner

Fig. 4

| Classification | | | | | 6 elements of function |
|---|---|---|---|---|---|
| Input | Trigger | | | | Input |
| | Precondition | | | | Precondition |
| | Postcondition | Condition for consecutively changing output value | Control parameter | | Control |
| | | Condition for stopping output (Output is stopped when exhaustion has occurred) | Spatial condition | Resource | Resource |
| | | | Temporal condition | Time restriction | Time |
| Output | | | | | Output |

Fig. 5

| 6 elements of function | Data name | Name of data outputting function |
|---|---|---|
| Trigger (I) | Truck judgment starting instruction | Feature quantity extracting function |
| Precondition (P) | Decisive feature of truck (Cargo bed exists, The number of wheels is greater than 4, Fuel tank can be seen) | Feature quantity judging function |
| Resource (R) | Feature without that vehicle cannot be judged as truck (Roof) | Feature quantity judging function |
| Time restriction (T) | N/A | |
| Control parameter (C) | Feature that is shared by truck and automobile, however, variable that can be used to judge vehicle as truck, depending on combination and degree of probability, (Existence/Nonexistence of rear seat, Existence/Nonexistence of nose part, Inclining of front window, Shape of front grille) | Feature quantity extracting function |
| Output (O) | Automobile and/or Truck and/or UNKNOWN | |

Fig. 7

Precondition (Sufficient condition) / Resource (Necessary condition)
- Truck
    - Sufficient condition
        - Cargo bed exists
        - Number of wheels > 4
        - Fuel tank exists
    - Necessary condition
        - Roof exists
- Automobile
    - Sufficient condition
        - Rear window exists
        - Number of wheels = 4
        - No fuel tank
    - Necessary condition
        - Tail exists

Fig. 9

Precondition (Sufficient condition) / Resource (Necessary condition)

▲ Truck
  ◇ Sufficient condition
    ● Cargo-bed/cargo exists (Old: "Cargo bed exists")
    ● Space exists under floor (Old: "Fuel tank exists")
    ● Vertically-long door shape (New)
  ◇ Necessary condition
    ● No roof (Old: "Roof exists")
▲ Automobile
  ◇ Sufficient condition
    ● Rear window exists (Same)
    ● No roof (Old necessary condition of trick)
  ◇ Necessary condition
    ● Tail exists (Same)

Fig. 10

| | | | |
|---|---|---|---|
| TRUCK | Cargo bed | T | F |
| | Number of wheels > 4 | * | * |
| | Tank | * | F |
| | Rear window | F | F |
| | No roof | F | F |
| | Tail | F | F |
| | | | |
| AUTOMOBILE | Cargo bed | F | F |
| | Number of wheels > 4 | F | F |
| | Tank | F | F |
| | Rear window | * | F |
| | No roof | F | T |
| | Tail | * | * |
| | | | |
| **** INCOMPLETE **** | Cargo bed | F | F |
| | Number of wheels > 4 | F | * |
| | Tank | F | T |
| | Rear window | T | F |
| | No roof | T | F |
| | Tail | * | F |
| | | | |
| **** INCONSISTENT **** | Cargo bed | F | |
| | Number of wheels > 4 | F | |
| | Tank | F | |
| | Rear window | F | |
| | No roof | F | |
| | Tail | F | |

Fig. 11

| **** INCOMPLETE **** | Cargo bed | F | F |
|---|---|---|---|
| | Number of wheels > 4 | F | * |
| | Tank | F | T |
| | Rear window | T | F |
| | No roof | T | F |
| | Tail | * | F |

Fig. 12

| **** INCONSISTENT **** | Cargo bed | F |
|---|---|---|
| | Number of wheels > 4 | F |
| | Tank | F |
| | Rear window | F |
| | No roof | F |
| | Tail | F |

Fig. 13

Control parameter
- Shape of front grille
- Existence/Nonexistence of rear seat
- Existence/Nonexistence of nose part
- Inclining of front window

Fig. 14

| **** INCONSISTENT **** | Cargo bed | F |
| --- | --- | --- |
| | Number of wheels > 4 | F |
| | Tank | F |
| | Large front grille | * |
| | Rear window | F |
| | No roof | F |
| | Tail | F |

Fig. 15

| **** INCONSISTENT **** | Cargo bed | F |
| --- | --- | --- |
| | Number of wheels > 4 | F |
| | Tank | F |
| | Rear seat | * |
| | Rear window | F |
| | No roof | F |
| | Tail | F |

Fig. 16

| **** INCONSISTENT **** | Cargo bed | F |
| --- | --- | --- |
| | Number of wheels > 4 | F |
| | Tank | F |
| | Nose | * |
| | Rear window | F |
| | No roof | F |
| | Tail | F |

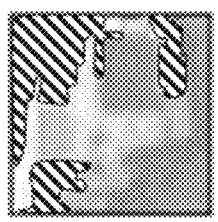 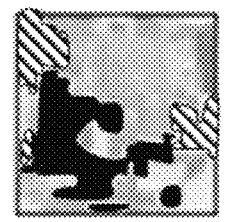
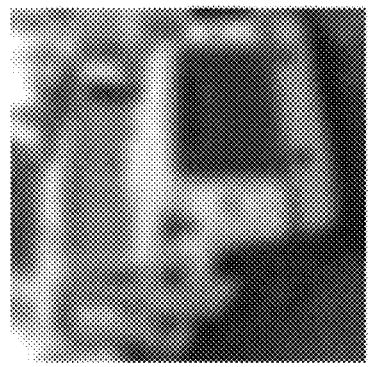 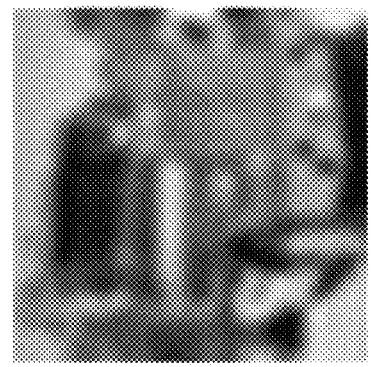
(c) (d)
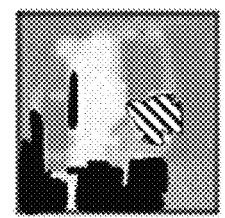 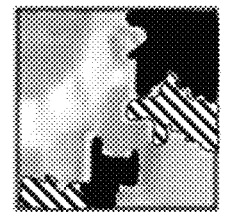
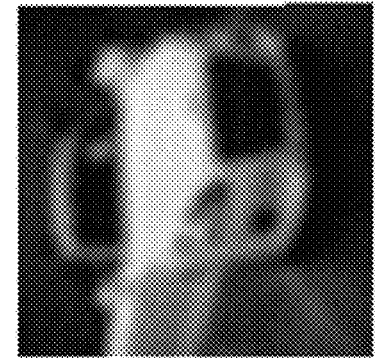 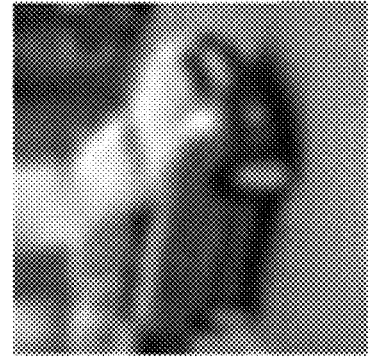
(e) (f)
Fig. 18

SAFETY VERIFICATION SYSTEM FOR ARTIFICIAL INTELLIGENCE SYSTEM, SAFETY VERIFICATION METHOD, AND SAFETY VERIFICATION PROGRAM

TECHNICAL FIELD

The present invention relates to a method for verifying safety of an artificial intelligence system.

BACKGROUND ART

In recent years, effectiveness of black-box-type artificial intelligence such as a deep neural network (DNN) or the like, with respect to which it is not possible to know the internal logical structure, has been improved, and a demand with respect to the use of the above artificial intelligence in a variety of fields is becoming higher. When using an artificial intelligence system, there may be a case wherein safety with respect to it becomes an issue. An important matter for ensuring safety of an artificial intelligence system is that appropriateness of an internal logical structure, that is obtained as a result of learning, can be judged, even if a stochastically high ground truth rate could be achieved thereby. In this regard, a similar problem also exists in relation to white-box-type artificial intelligence.

SUMMARY OF INVENTION

Technical Problem

However, in prior art, there is no effective system for verifying safety of an artificial intelligence system.

The present invention has been achieved in view of the above problems.

Solution to Problem

For solving the above problems, one aspect of the present invention is a safety verification system which comprises: a feature quantity information accepting unit which accepts feature quantity information that comprises values of plural feature quantities, that are assumed as those used in an artificial intelligence system, in each of plural first test data used for a test for verifying safety of the artificial intelligence system; and a judgment unit which judges a first combination, that is a combination that is not included in the plural first test data, in combinations of values that plural feature quantities may take, or a second combination, with it plural correct analysis results that should be derived by the artificial intelligence system are associated, in the combinations of the values that the plural feature quantities may take.

Further, another aspect of the present invention is a method executed by a computer system, and the method comprises: accepting feature quantity information that comprises values of plural feature quantities, that are assumed as those used in an artificial intelligence system, in each of plural first test data used for a test for verifying safety of the artificial intelligence system; and judging a first combination, that is a combination, that is not included in the plural first test data, in combinations of values that plural feature quantities may take, or a second combination, with it plural correct analysis results that should be derived by the artificial intelligence system are associated, in the combinations of the values that the plural feature quantities may take.

Further, another aspect of the present invention is a program that makes a computer system execute the above method.

BRIEF DESCRIPTION OF DRAWINGS

FIG. 4 is a figure showing six elements of a function in FRAM modeling.

FIG. 5 is a figure showing six elements of a function in a safety verification system according to an embodiment of the present invention.

FIG. 7 is a figure showing conditions identified by FRAM analysis in a safety verification system according to an embodiment of the present invention.

FIG. 9 is a figure showing conditions newly identified by FRAM analysis in a safety verification system according to an embodiment of the present invention.

FIG. 10 is a figure showing result of completeness analysis and consistency analysis applied to test result, that is written by the SpecTRM-RL language, with respect to an artificial intelligence system.

FIG. 11 is a figure showing result of completeness analysis in a safety verification system according to an embodiment of the present invention.

FIG. 12 is a figure showing result of consistency analysis in a safety verification system according to an embodiment of the present invention.

FIG. 13 is a figure showing added control parameters.

FIG. 14 is a figure showing result of consistency analysis, after addition of control parameters, in a safety verification system according to an embodiment of the present invention.

FIG. 15 is a figure showing result of consistency analysis, after addition of control parameters, in a safety verification system according to an embodiment of the present invention.

FIG. 16 is a figure showing result of consistency analysis, after addition of control parameters, in a safety verification system according to an embodiment of the present invention.

FIG. 18 is a figure showing outputted result of LIME in a safety verification system according to an embodiment of the present invention.

DESCRIPTION OF EMBODIMENTS

First Embodiment

In the following description, embodiments of the present invention will be explained with reference to the figures. A safety verification system according to the present embodiment is a system which performs safety verification of an artificial intelligence system to which a task is assigned. The artificial intelligence system according to the present embodiment is supposed to be an artificial intelligence system which uses image data, in which a vehicle is imaged, as input data, and judges whether the vehicle in the image is a truck or an automobile, as an example. It should be reminded that the above is mere example, so that, even if an artificial intelligence system is that to which a different task is assigned, the safety verification system according to the present embodiment can perform safety verification with respect to the artificial intelligence system.

(Construction of Safety Verification System)

Figure 1:
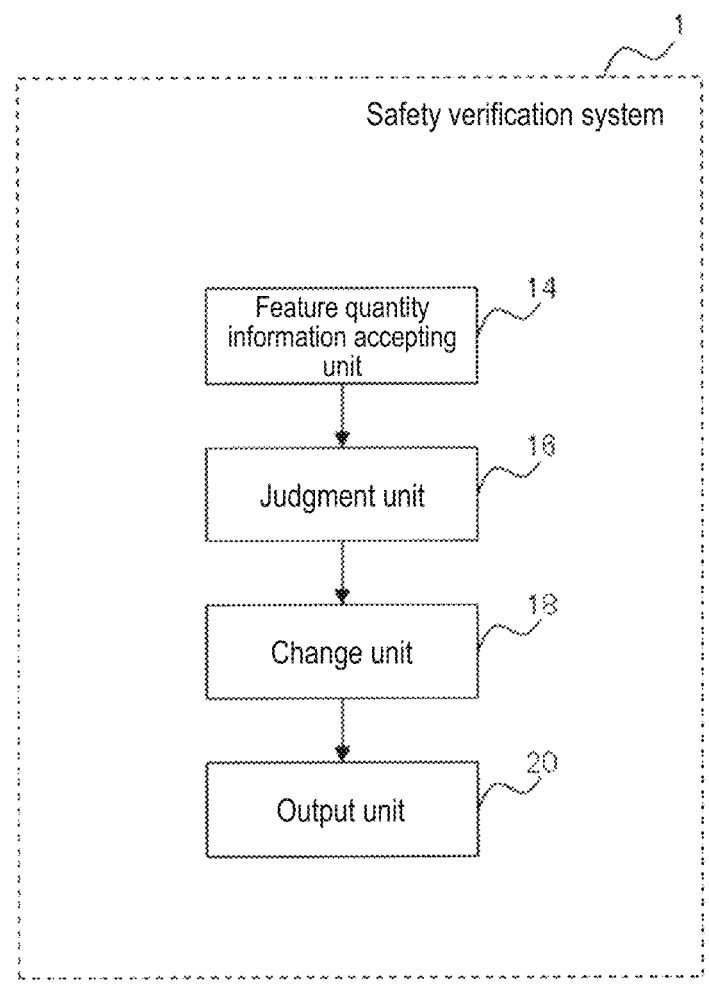
FIG. 1 is a figure showing a construction example of a safety verification system according to an embodiment of the present invention.

FIG. 1 is a figure showing a construction example of a safety verification system according to the present embodiment. As shown in FIG. 1, a safety verification system 1 according to the present embodiment comprises a feature quantity information accepting unit 14, a judgment unit 16, a change unit 18, and an output unit 20. The safety verification system 1 is a system for verifying safety of an artificial intelligence system (which is not shown in the figure).

The feature quantity information accepting unit 14 accepts feature quantity information comprising values of plural (N-dimension) feature quantities that are assumed as those used in an artificial intelligence system, in each first test datum in plural first test data used in a test for verifying safety of the artificial intelligence system. The feature quantity information may be information formed by associating correct analysis result with respect to each first test datum, that should be derived by artificial intelligence, with values of plural feature quantities in each first test datum. For example, in the present embodiment, an image datum including an image of a truck or an automobile is a first test datum that is an object of a test of an artificial intelligence system. Also, in the present embodiment, "a correct analysis result that should be derived by artificial intelligence" is a "truck" or an "automobile" relating to each first test datum. Further, the "value of the feature quantity" corresponds to a value of a parameter that is a feature quantity, in a test datum that is the object of processing of an artificial intelligence system. In the present embodiment, True/False (It may take values of both of them. The same hereinafter) showing whether feature quantities such as a cargo bed, the number of wheels, and a tank exist, or whether they satisfy conditions, in an image datum including an image of an automobile corresponds to the "value of the feature quantity." It should be reminded that the process for accepting the feature quantity information may be performed in accordance with operation of an input device such as a keyboard, a mouse, or the like of a user of the safety verification system 1, for example. In this regard, a feature quantity that is assumed as that used in an artificial intelligence system may be determined by using FRAM (Functional Resonance Analysis Method).

More specifically, for example, a user of the safety verification system 1 inputs, to the safety verification system 1 by using a keyboard or the like, values of respective parameters (for example, feature quantities such as a cargo bed, the number of wheels, and a tank) with respect to an image which is the test datum and includes therein an image of a truck or an automobile, wherein the values are determined by visually observing the image, and inputs a datum representing whether the vehicle in the image is a truck or an automobile (i.e., correct analysis result that should be derived by artificial intelligence). The above work is performed with respect to all images. The safety verification system 1 associates the inputted values of respective parameters and the datum representing whether the vehicle in the image is a truck or an automobile with each image, and stores them in a memory or the like. In this regard, it may not be required to directly input the feature quantity information by using an input device to the safety verification system 1. For example, by reading feature quantity information from a recording medium such as a removable memory or the like in which the feature quantity information has been stored in an external computer device, or by transmitting it from the external computer device via a wired or wireless network, the feature quantity information may be inputted to the safety verification system 1. Further, regarding determining of feature quantity information and inputting thereof to the safety verification system 1, a part or the whole thereof may be automated by a computer program. In such a case, the feature quantity information accepting unit 14 may accept feature quantity information from the computer program.

The judgment unit 16 judges a first combination, that is a combination that is not included in plural first test data, in combinations of values that plural feature quantities may take, or a second combination, with the combination plural correct analysis results that should be derived by artificial intelligence are associated, in the combinations of the values that the plural feature quantities may take. The first combination represents a combination of values of feature quantities that has not been tested in an artificial intelligence system. That is, the combination is a combination with respect to that the artificial intelligence system may not be able to perform judgment appropriately if a datum comprising the above combination of values of feature quantities is inputted to the artificial intelligence system (i.e., if the system is forced to perform processing of the datum) in the future, since the combination has not been tested by the artificial intelligence system; and is a combination representing incompleteness of the test data.

On the other hand, the second combination corresponding to the case wherein plural answers (trucks or automobiles) exist although the values of respective feature quantities are the same. For example, in the present embodiment, if a combination of True's/False's of feature quantities such as a cargo bed, the number of wheels, and a tank of an image datum including an image of a truck and that of an image datum including an image of an automobile are the same, the combination corresponds to the second combination. In the case that an artificial intelligence system has tested test data such as that explained above, and an image datum of a vehicle which has the above combination of values of feature quantities is inputted in the future to the artificial intelligence system, the artificial intelligence system may not be able to appropriately judge whether the vehicle in the image is a truck or an automobile. The second combination, that is such a combination of values of feature quantities explained above, is a combination representing possibility of lack of consistency of the artificial intelligence system. Further, in the safety verification system 1, in the case that the judgment unit 16 has judged that a second combination of values of feature quantities, that represents lack of consistency, exists in first test data, the feature quantity information accepting unit 14 accepts feature quantity information comprising new different values of feature quantities that should be adopted additionally.

In the case that a first combination, that is a combination of values of feature quantities and is not included in plural first test data, exists, the change unit 18 adds a new second test datum including the first combination of values of feature quantities to the plural first test data. The above adding process may be performed in accordance with operation of an input device such as a keyboard, a mouse, or the like of a user of the safety verification system 1, or a part or the whole thereof may be performed by a computer program. Further, the above adding process may be performed by reading second test datum from a recording medium in which the second test datum has been recorded. Further, making the artificial intelligence system perform a test of a set of test data to which the second test datum has been added will result in making the artificial intelligence system perform a test of test data comprising all combinations of values that plural feature quantities can take. That is, as a result thereof, completeness of the artificial intelligence system can be ensured.

Further, it may be constructed in such a manner that verification as to whether consistency has been maintained is further performed after addition of the second test datum, and new feature quantities may be adopted if it is judged that consistency is not maintained. Similarly, it may be constructed in such a manner that verification as to whether completeness of test data has been maintained is performed after making judgment representing lack of consistency and adopting new feature quantities, and a new test datum may be added if it is judged that completeness is not maintained.

The output unit 20 outputs test data for the artificial intelligence system, that comprises the second test datum added by the change unit 18, to the artificial intelligence system. Completeness of the artificial intelligence system is maintained by performing a test by using a set of test data that are outputted by the output unit 20 and comprise the second test datum. In this regard, in the case that the computer device which comprises the output unit 20 and the computer device in which the artificial intelligence system is operated are different from each other, the output unit 20 may output test data via a wired or wireless network to the computer device in which the artificial intelligence system is operated, or may output it via a recording medium such as a removable memory or the like (the output unit 20 may output it to a recording medium). On the other hand, in the case that the both computer devices are a same single device, the process for transmitting test data from a program for generating the test data to a program for realizing the artificial intelligence system, within the computer device, may correspond to the function of the output unit 20.

It should be reminded that the above-explained construction of the safety verification system 1 is a mere example, and the construction is not limited to the above construction.

(Hardware Construction)

Figure 2:
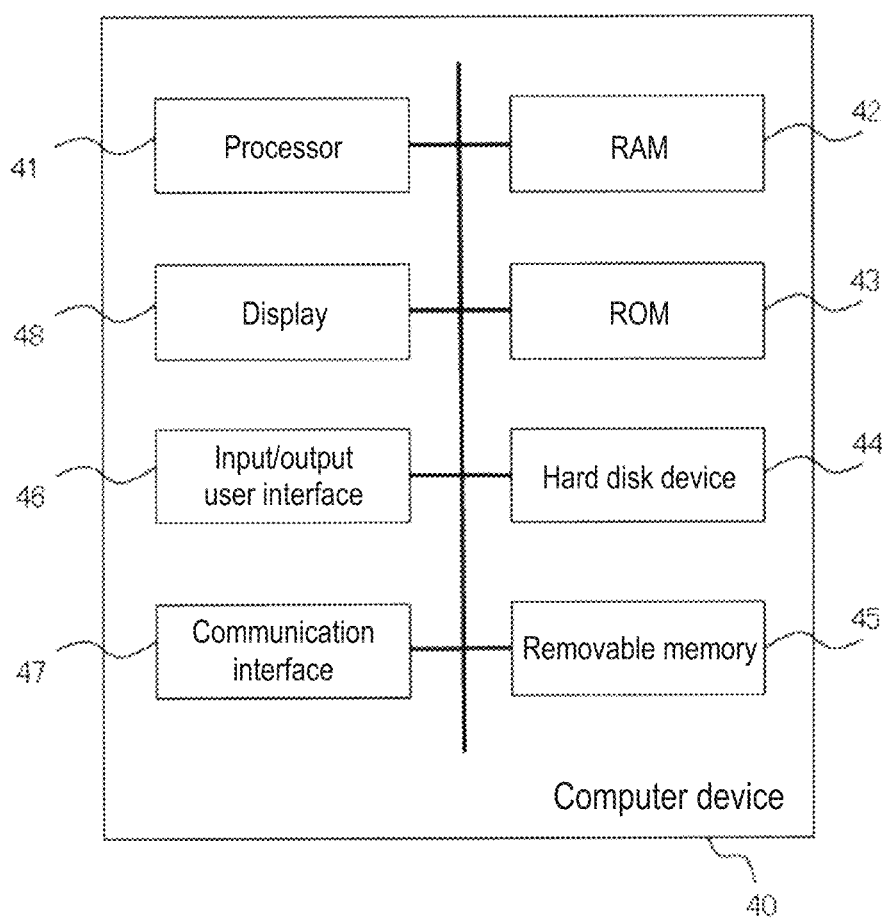
FIG. 2 is a figure showing an example of a hardware construction of a safety verification system according to an embodiment of the present invention.

The above-explained safety verification system 1 can be realized by using a hardware construction similar to that in a general computer device. FIG. 2 is a figure showing an example of a hardware construction of the safety verification system 1. A computer device 40 shown in FIG. 2 comprises, for example, a processor 41, a RAM (Random Access Memory) 42, a ROM (Read Only Memory) 43, a built-in hard disk device 44, a removable memory 45 such as an external hard disk device, a CD, a DVD, a USB memory, a memory stick, an SD card, or the like, an input/output user interface 46 (a keyboard, a mouse, a touch panel, a speaker a microphone, a lamp, and so on) for communication of various data between a user and the computer device 40, a wired/wireless communication interface 47 which can communicate with other computer devices, and a display 48. Each function of the safety verification system 1 according to the present embodiment may be realized, for example, by making the processor 41 read a program, that has been stored in the hard disk device 44 or the ROM 43, or the removable memory 45 or the like, into a memory such as the RAM 42 or the like, and execute the program, wherein, while executing the program, the processor 41 reads the above-explained respective data, that are required for processing, from the hard disk device 44 or the ROM 43, or the removable memory 45 or the like in an appropriate manner.

It should be reminded that the safety verification system 1 according to the present embodiment may be constructed as a single computer device, or may be constructed by using plural computer devices. In the latter case, the above-explained respective functions of the safety verification system 1 are realized in a distributed manner by the plural computer devices, and each of the computer devices may comprise a construction identical with or similar to the construction of the computer device 40 shown in FIG. 2.

It should be reminded that the hardware construction shown in FIG. 2 is a mere example, and the hardware construction is not limited to the above hardware construction.

Tangible Examples

In the following description, a tangible example of a safety verification method for an artificial intelligence system realized by the safety verification system 1 according to the present embodiment will be shown. For example, in the present embodiment, it is supposed that the artificial intelligence system uses, as an input datum, an image datum that includes an image of a vehicle, and that a task for judging whether the vehicle in the image is a truck or an automobile is assigned to the artificial intelligence system.

In the present tangible example, two techniques, specifically, FRAM (Functional Resonance Analysis Method) and SpecTRM (Specification Tools and Requirement Methodology), are used. FRAM is used for modeling a logical structure that is assumed as a logical structure that has been obtained by the artificial intelligence system. Also, SpecTRM is used for analysis of test result of the artificial intelligence system, correction of a FRAM model, and verification of safety.

In the present tangible example, first, a method that can clarify an internal logical structure of a black-box-type artificial intelligence system is disclosed. Also, a method that can comprehensively verify safety by using a formal method, by consulting the obtained internal logical structure, is disclosed. Further, by combining the two methods, the following matters can be achieved:

(1) The black-box-type artificial intelligence system is converted to a white-box-type artificial intelligence system by the FRAM method.

(2) Appropriateness of the FRAM model used for the white box conversion is verified by a consistency analysis algorithm of SpecTRM.

(3) Completion of verification of all logical paths of the artificial intelligence system, with respect to which appropriateness has been verified, is verified by a completeness analysis algorithm of SpecTRM.

In the present tangible example, images of automobiles and trucks, that are selected from data set of CIFAR-10 (https://www.cs.toronto.edu/~kriz/cifar.html), are used as learning data and test data (5000 sheets as learning data, and 2000 sheets as rest data). Further, CNN (Convolutional Neural Network) is used in implementation of artificial intelligence, and Keras (Tensorflow is used in the back end) is used in a library. A system, in which RMSprop is used as an optimization method, a sigmoid function is used as an activation function, and dropout (the ratio of dropout is 0.2) is further included, is constructed.

(Modeling of Artificial Intelligence System)

Figure 3:
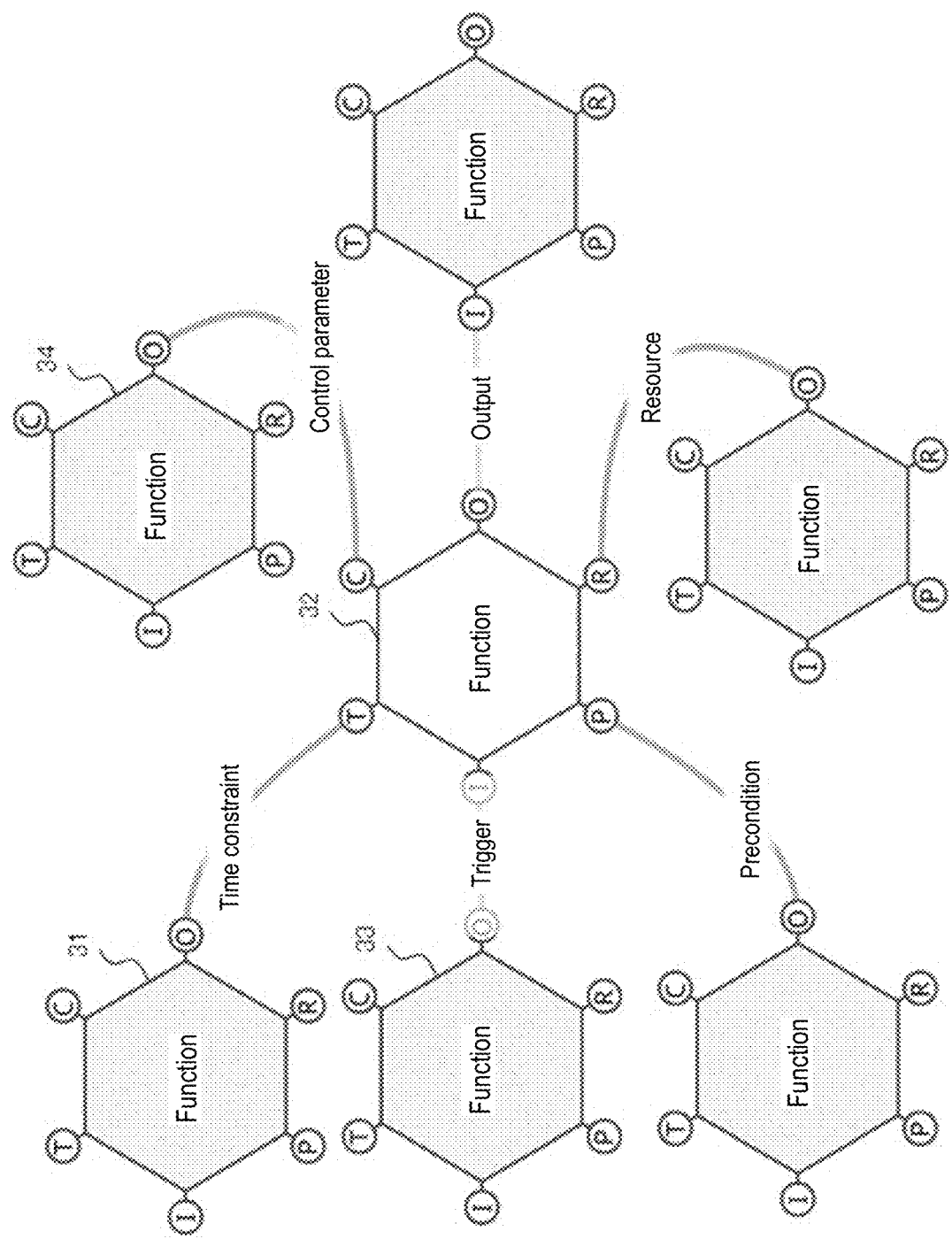
FIG. 3 is a figure showing an example of FRAM modeling.

In the safety verification system 1 according to the present embodiment, first, feature quantities are determined by using FRAM (Functional Resonance Analysis Method) to model an artificial intelligence system. In modeling using FRAM, how coupling between functions is made is graphically shown, as shown in FIG. 3. Regarding coupling between functions, it is possible to select a matter in six kinds of smatters shown in FIG. 3; and, as a result, in addition to merely showing the state "related" between functions, it becomes possible to give various meanings, such as "A is a precondition of B," "A provides B with a resource," "A gives an operation trigger to B," "A provides B with a control parameter," "A provides B with time restriction," and so on. The above six matters are referred to as "six elements of a function." As shown in FIG. 4, these six elements have comprehensiveness, and it allows modeling of all kinds of coupling between functions thoroughly. In FIG. 3, English letters I, P, C, R, T, and O are added to respective vertexes of a hexagon in which each function is described, and these English letters represent Trigger (I), Precondition (P), Control parameter (C), Resource (R), Time restriction (T), and Output (O) in FIG. 4, respectively. For example, the output (O) of the function 31 becomes the time restriction (T) of the function 32, the output (O) of the function 33 becomes the trigger (I) of the function 32, the output (O) of the function 34 becomes the control parameter (C) of the function 32, and so on.

For example, in an attempt to analyze artificial intelligence such as that in the present embodiment, which judges whether a vehicle in an image is an automobile or a truck, an internal logical structure of natural intelligence, which is used for judgment operation identical to above judgment operation, is inferred and the artificial intelligence is modeled. At the time, oversights and errors tend to occur, if the kinds of the functions relating to judgment are inferred blindly. Thus, by performing modeling of an artificial intelligence system in accordance with a modeling method of FRAM, related functions can be identified comprehensively.

Figure 6:
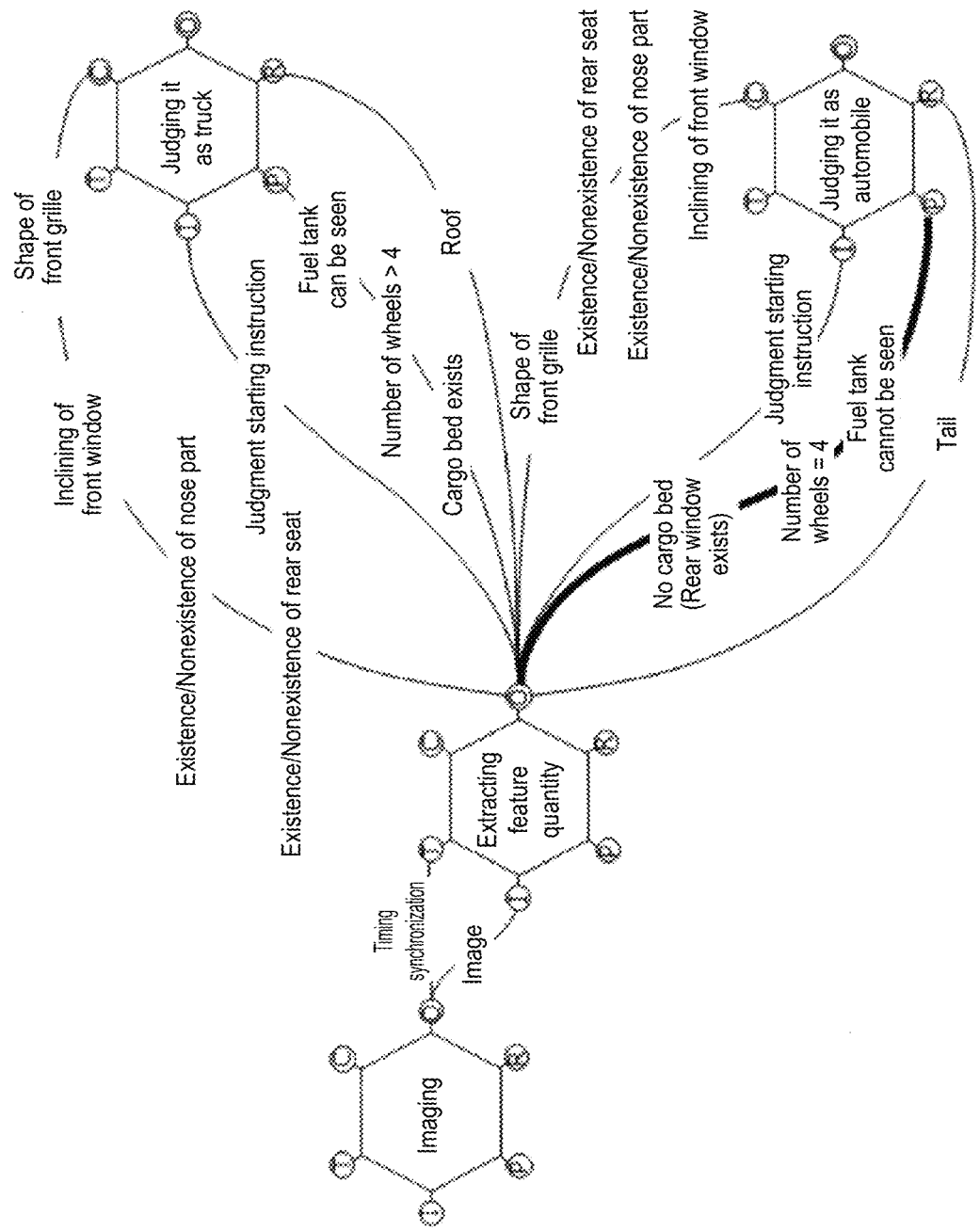
FIG. 6 is a figure representing, by an FRAM model, six elements of a function in a safety verification system according to an embodiment of the present invention.

For example, oversights can be prevented by considering interactions separately, for example, considering a matter that which input provides the function "judging an automobile/a truck" with "a trigger," and, similarly, a matter that which function provides the above with "time constraint," and so on. FIG. 5 is a table listing six elements of a judging function, data received by them, and functions that output the data. In the present embodiment, feature quantities corresponding to six elements, such as those in FIG. 5, with respect to a truck and an automobile, are determined by a human according to the modeling method of FRAM. Further, FIG. 6 is a figure representing, by an FRAM model, information in FIG. 5. In this regard, the table in FIG. 5 is that including descriptions about six elements of the "Judging it as a truck" function in FIG. 6, and, similarly, data about six elements of the "Judging it as an automobile" function in FIG. 6 also exist, and the data are the same as those shown in FIG. 6.

The table in FIG. 5 will be further explained. The "Precondition" is a sufficient condition for starting operation of a function. In the present case, a decisive feature quantity, with respect to the function for discrimination between a truck and an automobile, corresponds thereto. For example, "the number of wheels>4" is a decisive feature quantity, with respect to a truck. On the other hand, the "Resource" is a necessary condition. If it is exhausted, a function stops, however, it is not a decisive element such as a precondition, and it is a passive matter such that the function stops if it does not present. For example, the matter "the number of wheels=4" is not a decisive feature for an automobile (a truck, to which "the number of wheels=4" applies, exists); however, the matter "the number of wheel is greater than four" will never apply to an automobile. That is, the feature quantity "the number of wheels>4" is a sufficient condition with respect to a truck, and feature quantity "the number of wheels=4" is a necessary condition with respect to an automobile.

Further, regarding "Time restriction," in the present case, it is supposed that a system herein is not that which is based on sequential images, and is that which can perform recognition by using a sheet of an image. Regarding the method, it is supposed that a simple neural network is used. It is supposed that a more dynamic recognition technique is not used, from history of plural images. Further, regarding the "Control parameter," important feature quantities used for judgment, that is performed comprehensively by combining plural parameter values, are set as control parameters, wherein the kind of the vehicle cannot be identified in the case that a single parameter only in the above parameters is used. For example, although a feature that a front window is inclined often applies to an automobile, a truck having an inclined front window also exists. Further, an automobile which does not have an inclined front window also exists. There is just a tendency that many automobiles have inclined front window, and tracks rarely have inclined front window. Regarding learning of artificial intelligence, stochastically, the degree that a vehicle is judged as an automobile will become high if a front window is inclined. FIG. 6 is that wherein the above inputs/outputs are visualized by using FRAM Model Visualizer (http://functionalresonance.com/FMV/index.html).

Correlation of discrimination functions shown in FIG. 6 may change to a form in various forms according to change in data inputted to the artificial intelligence system. For example, in the case that an image datum, that is an input datum, does not include an image of a front side of a vehicle body, information regarding existence of a nose part is not detected by the artificial intelligence system. To the contrary, in the case that an image of a back side of a vehicle body is not included, information regarding existence of a cargo bed is not detected. The model of FRAM shows the maximum range of change of correlation of functions, and the whole of a part there of is used in behavior of an actual artificial intelligence system. In the case that a part thereof only is used, the action to list variations that can exist is referred to as "instantiation." Regarding the above matter, a comprehensive verification technique using a formal method will be further explained in detail later. That is a method wherein instantiation, that covers all combinations of parameters that are obtained from the FRAM model, is performed, and verification as to whether test result has completeness and consistency is performed. In the present case, an example of instantiation will be explained in the following description.

In instantiation, with respect to input data, that are result of execution of the artificial intelligence system (test result) and are directed to the safety verification system 1, labeling of True's/False's to respective parameters identified by FRAM is performed.

The conditions identified by FRAM analysis at the beginning were those shown in FIG. 7. Further, FIG. 8 is a table showing result of True/False labeling with respect to the above conditions (feature quantities).

Figure 8:
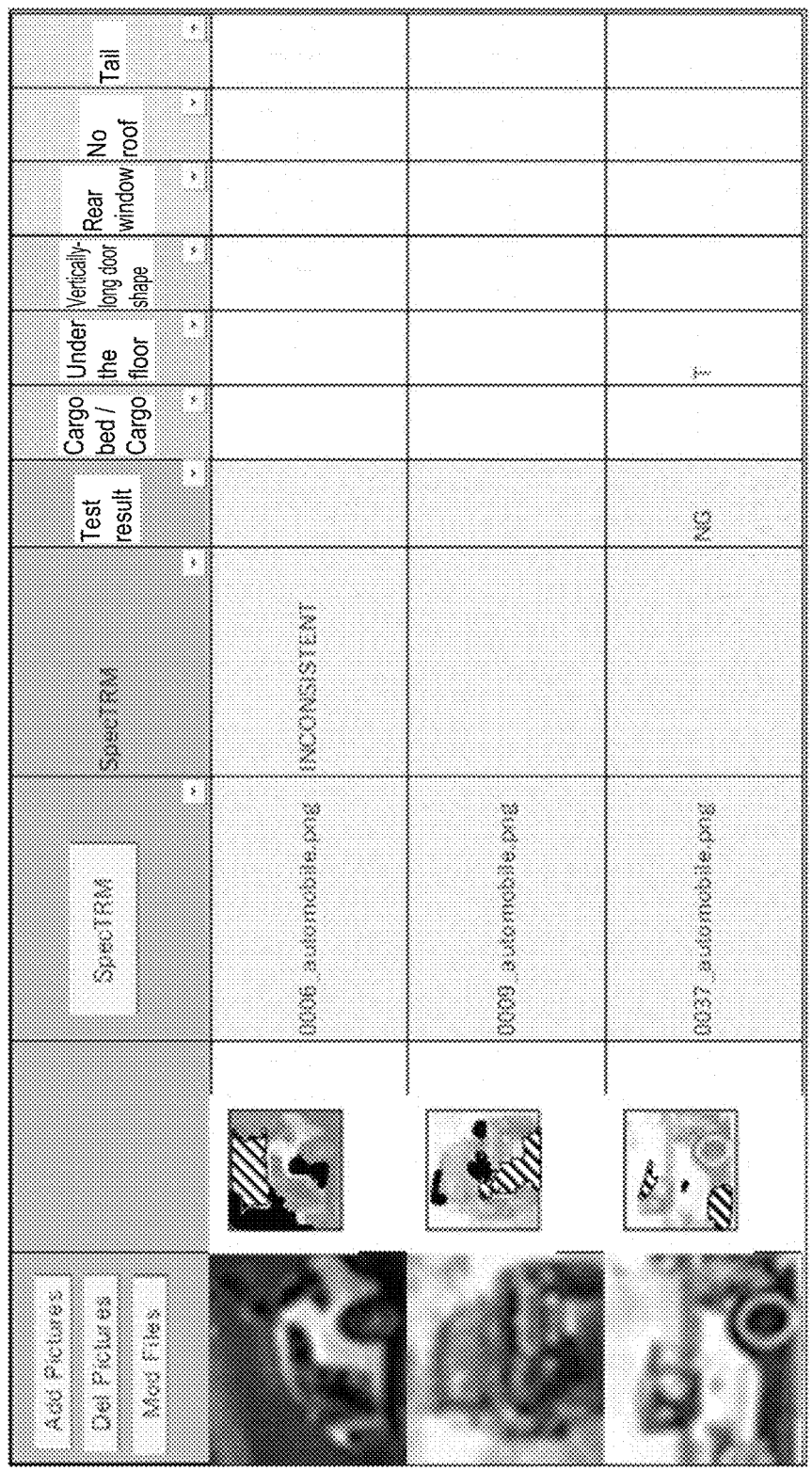
FIG. 8 is a figure showing result of True/False labeling with respect to identified conditions in a safety verification system according to an embodiment of the present invention.
Figure 17:
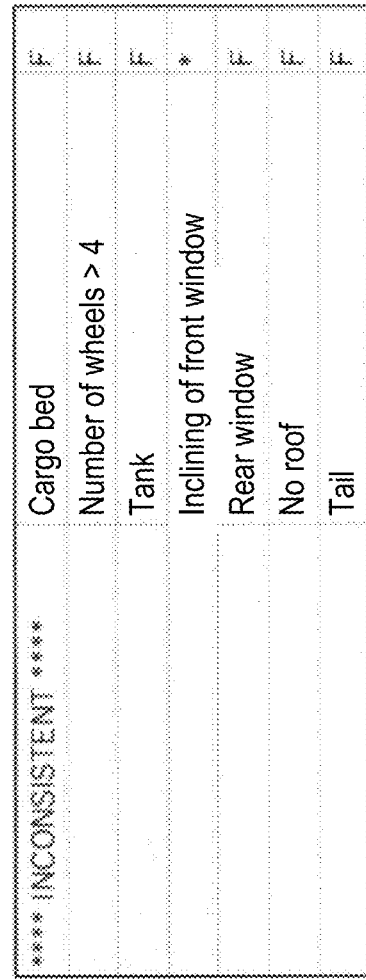
FIG. 17 is a figure showing result of consistency analysis, after addition of control parameters, in a safety verification system according to an embodiment of the present invention.

The first column in the table in FIG. 8 shows images used in the test. The second column shows images, wherein each image is obtained by using LIME (Local Interpretable Model-agnostic Explanations) that is an XAI (eXplainableAI) tool, and a shading or painting process is applied to parts, on which a neural network focuses, in each image. XAI is a technique for visualizing a point, in an image, on which artificial intelligence focuses, and a technique for visualizing a logical ground of decision making of the artificial intelligence. In each image, the part(s) shaded by oblique lines is(are) that(those) the neural network has focused on when evaluation "it is a truck" with respect to the image was made, and the part(s) painted black is(are) that(those) focused on when evaluation "it is not a truck" was made (In an actual image represented by LIME, the parts shaded by oblique lines in FIG. 8 are painted green, and the parts painted black are painted red; however, in FIG. 8, the above parts are shown as those shaded by oblique lines and those painted black, respectively. The same applies to FIG. 18). Labeling was performed, via visual observation by a human, while correcting the parameters in FIG. 7, that has been identified in the FRAM model at the beginning, by taking the above output results of LIME into consideration. In the process of labeling, sufficient conditions and necessary conditions that include newly identified parameters were those shown in FIG. 9 (the process until the results were outputted will be explained in detail later).

There are a number of cases wherein vertically-long door shapes of trucks are focused on; and the above is a feature of a truck that a human could not be able to recognize at the beginning, although artificial intelligence could be able to capture it. Further, like the case of a parameter "A roof exists=A necessary condition of a truck" (FIG. 7) that is opposite to a newly identified parameter "No roof exists=A sufficient condition of an automobile" (FIG. 9), logical symmetry was incorporated in a FRAM model at the beginning; and, in this regard, it has been found that artificial intelligence did not learn such logical symmetry, and simply obtained feature quantities of automobiles and feature quantities of trucks, respectively. The above shows that the above learning system can identify independent feature quantity parameters in respective categories, in a manner similar to that in the case of a two-value identification task, even in the case of three values or four values, and it is considered that the above is preferable result in terms of safety.

Through the above process, it is ascertained that omission in recognition, that may become a matter of concern in terms of safety, on the side of artificial intelligence does not occur in the corrected FRAM model and the initial FRAM model. In resilience engineering, an initially assumed FRAM model is referred to as "Work As Imagined (WAI)" and an actual model that is result of learning is referred to as "Work As Done (WAD)," and, in the case that there is a significant difference between the above two models, the difference is the change generated by adjustment of the artificial intelligence system and is the root of resilience that yields safety, and, at the same time, in the case that there is unintended change in WAD, that is regarded as a risk factor that becomes a cause of unintended behavior. In the case of this time, since a difference that has appeared in the WAD is a reasonable discovery on the side of artificial intelligence, specifically, the vertically-long door shape, the difference can be taken positively, and identified as a success factor in terms of safety.

In the following description, result of performing of comprehensive verification of labeled test data, by using SpecTRM that is a formal method, will be explained in detail.

(Verification of Safety by SpecTRM-RL)

Safety verification by a formal method was performed by using a draft FRAM model according to initially identified parameters shown in FIG. 7. The language used in the formal method was SpecTRM-RL (SpecTRM Requirement Language). The above language makes it possible to define all combinations of conditional branches relating to state transition in a compact manner as shown in FIG. 10, and identify lack of completeness, that represents existence of an undefiled condition combination, and lack of consistency, that represents the state that one condition combination is associated with plural state-transition conditions.

As a result of completeness analysis, a condition combination, with respect to that the definition thereof is insufficient, is outputted to the row of "*INCOMPLETE" in FIG. 10; and, similarly, as a result of consistency analysis, a condition combination, that allows transition to plural states based on one condition so that there is no consistency in behavior of the system, is outputted to the row of "*INCONSISTENT****."

Regarding each condition definition, two values, specifically, True/False, are defined, and, regarding the condition, logical formulas such as four arithmetic operations and so on can be included. Further, by using "*" when either one of "T" representing True and "F" representing False is acceptable, the definition can be made compact.

FIG. 10 is a table showing result of completeness analysis and consistency analysis applied to test result, that is written by the SpecTRM-RL language, with respect to the artificial intelligence system. More specifically, verification with respect to whether a vehicle in each image, in 2000 sheets of test data, is a truck or an automobile was performed by visually observing the image by a human, result data (feature quantity information) obtained by visually verifying True's/False's regarding respective feature quantities of the vehicle in the image are accepted by the feature quantity information accepting unit 14, and, thereafter, the result data are aggregated by the judgment unit 16, and the table in FIG. 10 shows the result of aggregation of the result data. The aggregation process was performed by using software for aggregation. In this regard, methods of the completeness analysis and the consistency analysis are not limited to those explained above. For example, in the present example, all of the 2000 sheets of test data were visually verified by a human; however, it may be possible to made a computer system perform a part of the above process for improving work efficiency, for example.

A completeness analysis algorithm and a consistency analysis algorithm are represented by formula (1) and formula (2) shown below, respectively.

[Formula 1]

$$C_{complete} = \forall\, a \in A,\ \exists\, b \in B \text{ s.t. } a - b = 0 \qquad \text{Formula (1)}$$

[Formula 2]

$$C_{consistent} = \prod_{i=1}^{n-1} |b_i \in B - b_{i+1} \in B| > 0 \qquad \text{Formula (2)}$$

Regarding the above, it is defined as follows:

A: A universal set wherein vectors "F, F, F, F . . . F" to "T, T, T, . . . T" are digitized as binary digits B: Those obtained by digitizing, with respect to all test data of artificial intelligence, vector values as binary digits in a manner similar to that in the case of above A N: The number of elements in set B In SpecTRM analysis, completeness of a test case is verified by completeness analysis. As a result of the completeness analysis, it is ascertained that a combination of values of feature quantities shown in FIG. 11 has not been tested.

Irrespective of the correct answer rate, in the case that a case that has not been tested exists as explained above, the theoretical ground for proving safety of the system is insufficient. For making the test thereof be performed, it is necessary to modify the test data. The insufficient test data shown in FIG. 11 are data comprising "no roof exists" and "a rear window exists" (a Targa (a registered trade mark) top open car, or the like), data comprising "no cargo bed exists" and "no fuel tank exists," and so on.

Next, consistency of the test case was verified by performing consistency analysis. As a result of the consistency analysis, with respect to a combination of parameter values shown in FIG. 12, different judgment results were outputted (it was judged as both "TRUCK" and "AUTOMOBILE") by using a same condition.

The data having no consistency, that are shown in FIG. 12, are data wherein "False"s are assigned to all indispensable parameters, i.e., none of feature quantities exists on the vehicle in the image. Regarding the data group wherein "False"s are assigned to all parameters, it is first suspected that a parameter, that has been unknown and could be found only by the artificial intelligence system, may exist. Thus, verification as to whether consistency is yielded by using other parameters (a "control" parameter group) extracted by the FRAM analysis was performed. Regarding FIG. 14 to FIG. 17, a control parameter, that is selected from control parameters shown in FIG. 13 in a one-by-one manner from top to bottom thereof, was added sequentially to the initial parameters (FIG. 12), and, with respect to the added parameters, 2000 sheets of test data were visually verified.

As shown in FIG. 14 to FIG. 17, with respect to "Large front grille," "Existence/Nonexistence of rear seat," "Existence/Nonexistence of nose part," and "Inclining of front window," the value of any one of them was "*," that is, all of the parameters were feature quantities shared by a truck and an automobile. Thus, the result is that lack of consistency was simply added further by the added parameters. That is, regarding the above feature quantities, effect to improve consistency with respect to result of learning could not be recognized.

Thus, for knowing a parameter that does not correspond to any of all parameters identified by FRAM, i.e., a feature quantity that was not found by a human and could be found only by artificial intelligence, each image, with respect to which all feature quantities are judged as those corresponding to "False"s, was visually verified by a human thoroughly. As a result, features such as those shown in FIG. 18 could be found. FIG. 18 shows outputted result of LIME.

In FIG. 18, with respect to both an automobile and a truck, focus points for shading by oblique lines (each of the focus points corresponds to a part that was focused when artificial intelligence has judged a vehicle in an image as "it is a truck") are marked on front bumper parts. The color of the front bumper of the automobile in each of images (a) and (c) is the same as the color of the vehicle body, and the color of the front bumper of the truck in each of images (c) and (d) is different from the color of the vehicle body.

Regarding the above feature quantity, it was found that it has a significance meaning, since the number of data having no consistency was reduced from 189 to 42. That is, it is proven that the artificial intelligence discriminates between a truck and an automobile based on the color of a front bumper.

As explained above, for evaluating appropriateness of an internal logical structure model of an artificial intelligence system made by using FRAM, a consistency analysis algorithm of SpecTRM, that is one of formal methods, was used. By performing correction until consistency of a model is guaranteed, an internal logical structure of artificial intelligence can be revealed in such a manner that it is interpretable for a human and consistency between it and outputted result is maintained.

It should be reminded that, although the case that all parameters correspond to "False"s and a new parameter is added thereto has been explained as an example of a no consistency case, there are other cases such as a case that a feature quantity parameter is deleted or corrected. That is, regarding the parameter "a fuel tank exists under a floor," it was initially considered that the parameter is an important parameter for identifying a truck, and was included in the FRAM model (FIG. 7); however, as a result of verification, it is proved that artificial intelligence does not focus on the above feature quantity at all. Thus, the above parameter was deleted, and, in place thereof, the feature quantity "a wide space exists under a floor" was newly adopted (FIG. 9). The feature quantity "a wide space exists under a floor" was determined by using a method similar to that explained by using FIG. 13 to FIG. 17.

(Flow of Process)

Figure 19:
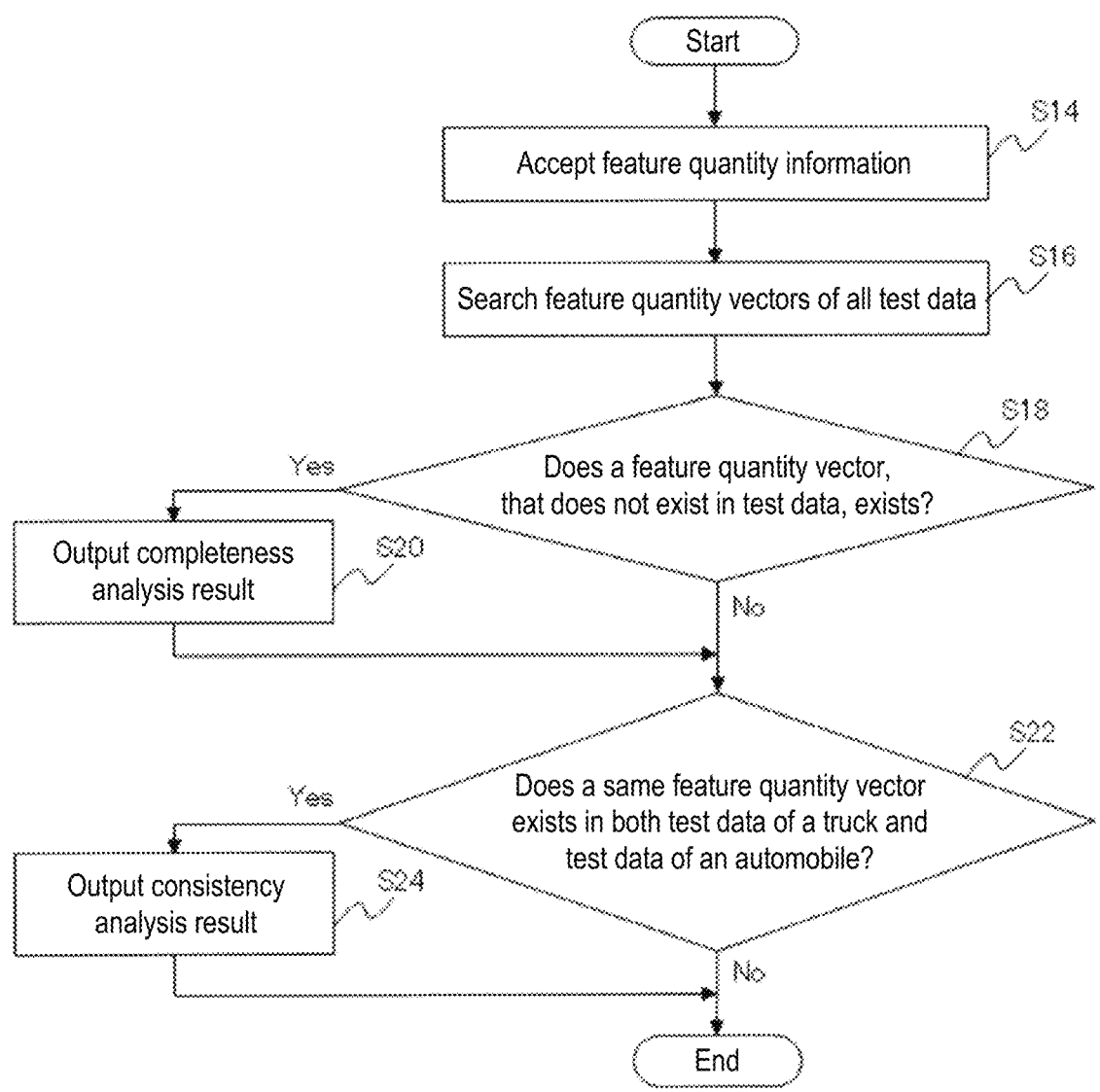
FIG. 19 is a flow chart showing an example of a process in a safety verification system according to an embodiment of the present invention.

An example of a process in the safety verification system according to the present embodiment will be explained with reference to FIG. 19. FIG. 19 is an example of a processing flow of completeness analysis and consistency analysis according to SpecTRM, after plural feature quantities, that are expected to be used in an artificial intelligence system, are determined by using FRAM (i.e., after first modeling of an artificial intelligence system).

In step S14, in the feature quantity information accepting unit 14, feature quantity information is accepted, wherein the feature quantity information comprises correct analysis result (a truck/an automobile), that should be derived by the artificial intelligence system, with respect to a vehicle in an image that is a test datum, and data representing values (True's/False's) of respective feature quantities with respect to the vehicle in the image. Adopted feature quantities and values of the respective feature quantities may be determined by using a LIME tool as explained above. In this regard, regarding the above process, a part or the whole of it may be automated by using a tool such as ACE (Automated Concept-based Explanation) or the like, as explained later.

Next, in step S16, a search process of feature quantity vectors of all test data is performed. The above process may be executed by using a SpecTRM tool or the like. The present step is executed by the judgment unit 16 mainly. In the present case, a feature quantity vector is a vector value representing a combination of values of feature quantities. For example, in the case that values with respect to feature quantities (Cargo bed, The number of wheels>4, Tank, Rear window, No roof, and Having a tail) in a set are (F, F, F, T, T, *), respectively, it can be represented as a vector "F, F, F, T, T, *." In the case of the present example, the feature quantity vector can take a value in "F, F, F, F, F, F" to "T, T, T, T, T, T."

In step S18, the judgment unit 16 performs judgment as to whether a feature quantity vector (a combination of values of feature quantities), that does not exist in all test data, exists. If the feature quantity vector exists (step S18: Yes), completeness analysis result representing a state that the test data is incomplete is outputted (step S20).

Next, in step S22, the judgment unit 16 performs judgment as to whether a same feature quantity vector exists in both test data of a truck and test data of an automobile. If the feature quantity vector exists (step S22: Yes), consistency analysis result representing no consistency is outputted (step S24), and the process is terminated.

It should be reminded that, in the case that the completeness analysis result outputted in step S20 is that representing a state that the test data is incomplete, integrity of the test will be guaranteed by newly adding, thereafter, a test datum (a second test datum) such as that having a feature quantity vector that does not exist in the test data (first test data).

Further, in the case that the consistency analysis result outputted in step S24 is that representing no consistency, it may be possible to repeat, thereafter, the process for confirming whether integrity will be guaranteed as a result of addition of a new different feature quantity. More specifically, for example, with respect to the new-feature-quantity-added feature quantity information, the process from step S14 is repeated.

In the above embodiment, a method for generating, from result of test of black-box-type artificial intelligence, a model that can be interpreted by a human (FRAM analysis), and confirming and improving appropriateness of the above model by a formal method (SpecTRM consistency analysis), and a method for verifying completeness of result of test of artificial intelligence (SpecTRM completeness) have been explained. By performing, based on the present method, verification of safety of an artificial intelligence system, it becomes possible to perform verification after changing a black box to a white box, and, in addition thereto, know, as a result of verification of safety, the matter that artificial intelligence has obtained, as a result of learning, a new logic that could not be conceived of by a human.

The greatest characteristic of the present method is that the method has the following two aims when considering safety verification of artificial intelligence:

(1) Correcting incompleteness of test of artificial intelligence and nonconsistency of a model (2) Perceiving a logic, that could be able to obtain only by artificial intelligence, and correcting a cognitive model of a human It should be reminded that the present method can be applied to white-box-type artificial intelligence, in addition to black-box-type artificial intelligence. Even in the case of white-box-type artificial intelligence, it is possible to discover, based on result of consistency analysis, the matter that the artificial intelligence has obtained a hidden condition, and, as a result, it becomes possible to improve a white-box model. For example, by constructing a FRAM model after identifying, as much as possible, feature quantities obtained by artificial intelligence by using a method for explaining result of a feature map of CNN, a further precise explanatory model can be constructed. Further, formal verification by SpecTRM can be adopted in verification of a mechanism using a combination of models that can be explained such as an ensemble tree.

As explained above, the technique used in the above embodiment is not that taking the place of existing techniques for explaining logical structures of artificial intelligence, and can be positioned as a technique that unifies them and provides a method for verifying safety more certainly.

Second Embodiment

In consistency analysis, in addition to above-explained formula (2), following formula (2-1) can be adopted:

[Formula 3]

$$C_{consistent} = \prod_{i=1}^{n-1} \prod_{j=i+1}^{n} (|b_i \in B - b_j \in B| > 0) \quad \text{Formula (3)}$$

When realizing the invention relating to the first embodiment by using a computer program, it is processed in such a manner that the form representing a vector value of test data by using "T"s and "F"s is converted to the form representing it by using "0"s and "1"s, sorting in ascending order is performed, and a vector value is compared with a next vector value in a one-by-one manner from the top of the vector values sequentially.

In the present embodiment, it is possible to compare a character string datum comprising "T"s and "F"s representing a vector value of element $b_i$ and that of element $b_j$ without converting them to binary digits. As a result, it becomes possible to suppress consumption of the memory and it becomes possible to suppress excessive degrading of performance due to increasing of the quantity of test data, when executing the computer program.

Third Embodiment

In the first embodiment, LIME is used as an XAI tool, and, in this regard, it is possible to use ACE (refer to https://papers.nips.cc/paper/9126-towards-automatic-concept-based-explanations) or the like in place of LIME.

ACE is one of XAI techniques. ACE outputs the rationale by a set of patch images. Each set represents specific "concept" of clustered images. For example, when a learned neural network classifies an "ambulance" from a specific image, ACE analyzes the learned model and creates a set of "concept" images representing specific features of a classification task.

Figure 20:
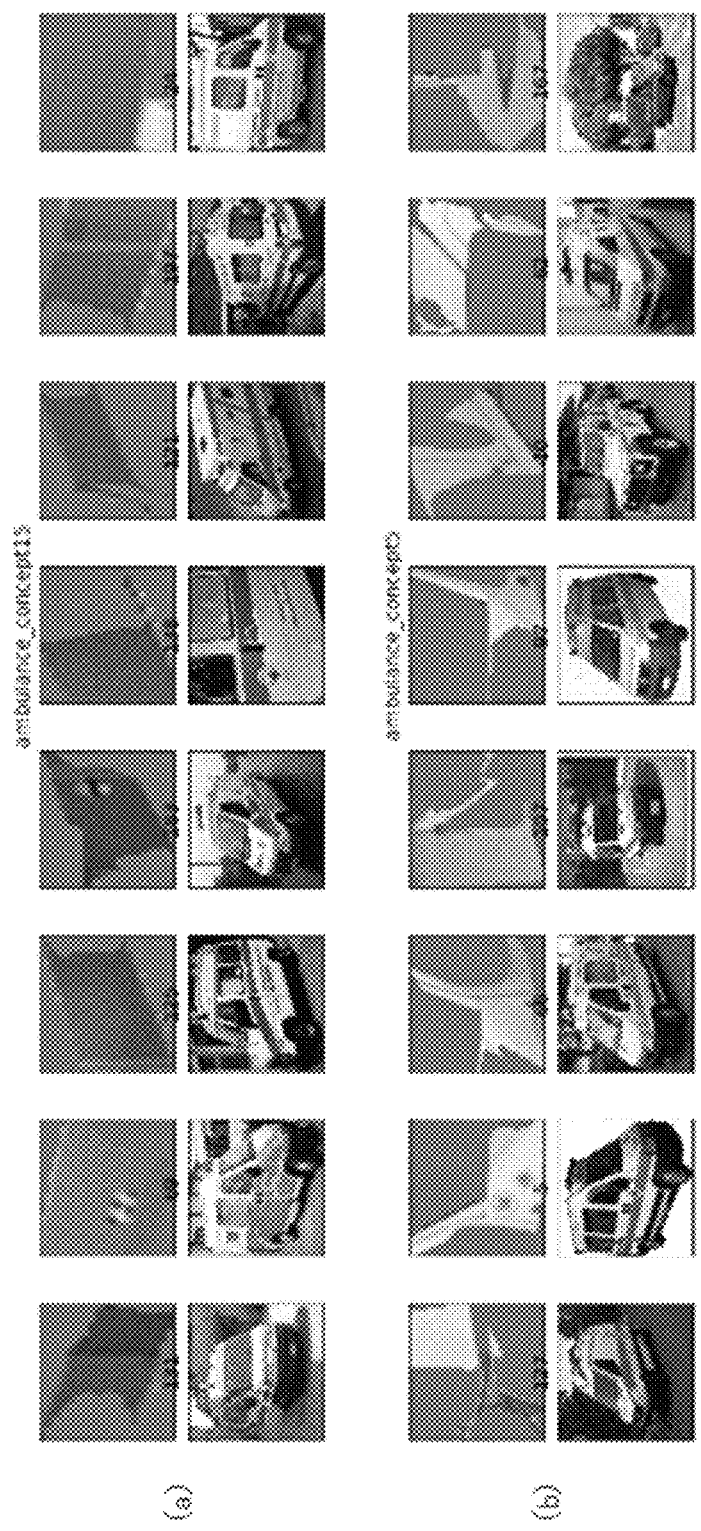
FIG. 20 is a figure showing examples of outputs of ACE in a safety verification system according to an embodiment of the present invention.

FIG. 20 shows examples of outputs of ACE when learned artificial intelligence has identified ambulances. The present examples are outputs of ACE, that are outputted as a result that GoogLeNet (https://arxiv.org/abs/1409.4842), that is a learned-model, is operated to learn image data of jeeps and ambulances extracted from ImageNet (http://www.imagenet.org), and, thereafter, the artificial intelligence is operated to perform a classification task by using images of jeeps and images of ambulances (200 sheets of images, respectively). Items (a) and (b) are sets of images outputted in relation to respective concepts. In the image set (concept 15) in item (a), parts of orange lines of ambulances have been recognized. In the image set (concept 5) in item (b), parts of white bodies of ambulances have been recognized. (An orange line and a white body are requirements for general external appearance of an ambulance in the United States.) If these image sets are visually observed by a human, it will be possible to easily infer that the artificial intelligence judges an object as an ambulance by focusing attention on an orange line and a white body.

As explained above, in the case that a LIME tool is used, parts of each image, that are focused on by artificial intelligence, are colored in pixels and outputted, as shown in FIG. 8 and FIG. 18. Thereafter, by visually observing it by a human, the parts that are considered as those focused on by artificial intelligence are specified as components such as a cargo bed, a tank, a rear window, a roof, and so on. Regarding identifying of a component corresponding to a part colored by the LIME tool, judgment thereof is made by a human who has visually observed it. ACE divides an image into some components, and groups a component having a high degree of attention with components similar thereto, and, as a result, the XAI tool itself shows the "meaning" of each component. As a result, judgment regarding which feature the artificial intelligence focuses on, with respect to each test datum, is automated mostly. There will be the following merit by adopting the ACE tool:

(1) ACE groups images, with respect those similar feature parts have been focused on, into a set and outputs the set; so that, when determining feature quantities, room for the subjective view of a human can be reduced further.

(2) ACE groups images, with respect those similar feature parts have been focused on, into a set and outputs the set, and a human determines feature quantities from the outputted set; so that work time required for determining feature quantities can be reduced greatly.

(3) ACE can extract a concept by using a learned neural network model.

In the above description, embodiments of the present invention have been explained, and, in this regard, it is needless to state that the present invention is not limited to the above-explained embodiments, and can be implemented in any of various different modes within the scope of the technical idea of the present invention.

Further, the scope of the present invention is not limited to the illustrated embodiments described and shown in the figures, and it comprises all embodiments which provide effect that is equal to that the present invention aims to provide. Further, the scope of the present invention is not limited to combinations of characteristics of the invention defined by respective claims, and it can be defined by any desired combinations of specific characteristics in all of disclosed respective characteristics.

REFERENCE SIGNS LIST

1 Safety verification system
14 Feature quantity information accepting unit
16 Judgment unit
18 Change unit
20 Output unit
40 Computer device
41 Processor
42 RAM
43 ROM
44 Hard disk device
45 Removable memory
46 Input/output user interface
47 Communication interface
48 Display

The invention claimed is:

1. A safety verification system comprising:
a feature quantity information accepting unit which accepts feature quantity information that comprises values of plural feature quantities, that are assumed as those used in an artificial intelligence system, in each of plural first test data used for a test for verifying safety of the artificial intelligence system; and
a judgment unit which judges a first combination, that is a combination that is not included in the plural first test data, in combinations of values that plural feature quantities may take, or a second combination, with it plural correct analysis results that should be derived by the artificial intelligence system are associated, in the combinations of the values that the plural feature quantities may take.

2. The safety verification system as recited in claim 1, wherein the feature quantity information is information formed by associating correct analysis result with respect to each first test datum, that should be derived by the artificial intelligence system, with values of the plural feature quantities in each first test datum.

3. The safety verification system as recited in claim 1, wherein the plural feature quantities are determined by using FRAM (Functional Resonance Analysis Method).

4. The safety verification system as recited in claim 1, further comprising a change unit which adds, in the case that the first combination of the values of the feature quantities with respect to the plural first test data exists, a second test datum comprising the first combination of the values of the feature quantities to the first test data.

5. The safety verification system as recited in claim 4, further comprising an output unit which outputs test data comprising the second test datum to the artificial intelligence system.

6. The safety verification system as recited in claim 1, wherein, in the case that the second combination of the values of the feature quantities exists in the plural first test data, the feature quantity information accepting unit accepts feature quantity information comprising a value of a new feature quantity other than the plural feature quantities.

7. A method executed by a computer system, comprising:
accepting feature quantity information that comprises values of plural feature quantities, that are assumed as those used in an artificial intelligence system, in each of plural first test data used for a test for verifying safety of the artificial intelligence system; and
judging a first combination, that is a combination that is not included in the plural first test data, in combinations of values that plural feature quantities may take, or a second combination, with it plural correct analysis results that should be derived by the artificial intelligence system are associated, in the combinations of the values that the plural feature quantities may take.

8. A non-transitory, tangible computer readable storage medium, on which a computer program is stored for causing a computer system to execute the method according to claim 7.

* * * * *